Patented June 11, 1946

2,401,904

UNITED STATES PATENT OFFICE 2,401,904

PLASTIC SOLVENT COMPOSITION

Reginald Francis Buller, West Los Angeles, Calif., assignor to Shell Development Company, San Francisco, Calif., a corporation of Delaware No Drawing. Application March 6, 1944, Serial No. 525,313

6 Claims. (Cl. 106—187)

This invention relates to compositions comprising plastic substances and mixtures of methyl isobutyl ketone with diisobutyl ketone.

Large numbers of compounds have been suggested as solvents for organic plastic substances. For cellulose nitrate normal butyl acetate is one of the best solvents and is often used as a standard by which other solvents are evaluated. Normal butyl acetate is relatively expensive and the cost of using it as a solvent in lacquers is often reduced by diluting it with substances which are non-solvents for the cellulose nitrate and by partially or completely substituting it with other solvents or solvent mixtures. Substitutes which have been employed include mixtures of two or more ketones with one another and mixtures of one or more ketones with one or more alcohols.

New solvents have now been discovered for organic plastics which offer distinct and important advantages over any solvents which have been previously used, so far as I am aware. The new solvents comprise mixtures of methyl isobutyl ketone with diisobutyl ketone and may contain also one or more alcohols of aliphatic character. Solvent mixtures containing these ketones and isopropyl alcohol have been found to have higher dilution ratios for highly aromatic hydrocarbon diluents than normal butyl acetate or mixtures comprising other ketones, such as mixtures of methyl isobutyl ketone with methyl isobutyl carbinol. The viscosities of solutions of cellulose nitrate and other plastics with methyl isobutyl ketone/diisobutyl ketone mixtures are lower than those of equal concentrations of cellulose nitrate in normal butyl acetate, an advantage in that a finished lacquer composition of given viscosity requires less solvent. One of the most outstanding advantages of the new solvent mixtures is the extremely high blush-resistance of lacquers containing them.

Accordingly, an object of the present invention is to provide new and improved solvents for organic plastics. Another object is to provide solvent mixtures having high dilution ratios. Another object is to provide new organic plastic compositions. Another object is to provide new coating compositions. Another object is to provide lacquers of low viscosity having improved blush-resistance. Other objects will be apparent from the description of the invention given hereinafter.

While the proportions of methyl isobutyl ketone to diisobutyl ketone in the solvent mixtures of the invention can be varied over a wide range, for cellulose derivatives it is most generally preferred to employ mixtures having approximately the same over-all evaporation rate as normal butyl acetate. Solvents evaporating too rapidly tend to produce uneven films. Those evaporating too slowly may result in films which are insufficiently hard. A mixture of 86.7 parts by weight of methyl isobutyl ketone with 13.3 parts by weight of diisobutyl ketone has an evaporation rate of 1.0 as compared to normal butyl acetate. Mixtures containing larger proportions of methyl isobutyl ketone evaporate more rapidly. A mixture of 90 parts of methyl isobutyl ketone with 10 parts of diisobutyl ketone has an evaporation rate of 1.22. Mixtures of methyl isobutyl ketone with diisobutyl ketone in a ratio smaller than 86.7 to 13.3 have evaporation rates less than 1.0. Preferred mixtures of methyl isobutyl ketone with diisobutyl ketone are within the ratio range of about 91:9 to about 82:18, respectively. The evaporation rates were determined in accordance with the method described in Ind. Eng. Chem. 28, 342 (1936).

Mixtures of methyl isobutyl ketone with diisobutyl ketone have high dilution ratios. "Dilution ratio" is a numerical measure of the solvent power of a substance for a given material. As used herein, it is the ratio of the weight of non-solvent diluent to the weight of solvent in a mixture consisting of non-solvent diluent, solvent and ½ second R. S. nitrocellulose at the point of the incipient precipitation of the nitrocellulose. It may be looked upon as the maximum amount of non-solvent diluent, expressed as the ratio thereof to solvent, which can be added to a solution of ½ second R. S. nitrocellulose without causing the precipitation of the nitrocellulose at a final concentration of 8% of nitrocellulose by total weight of solution.

It has been found that the tolerance of methyl isobutyl ketone/diisobutyl ketone mixtures for non-solvent diluents can be even further increased by the addition of isopropyl alcohol, the dilution ratios, in the case of aromatic diluents, increasing with increasing amounts of isopropyl alcohol up to 22% of isopropyl alcohol by weight of the total amount of methyl isobutyl ketone and diisobutyl ketone.

The dilution ratios of several nitrocellulose solvents with toluene, an aliphatic petroleum hydrocarbon diluent containing 7% to 8% aromatics and an aromatic diluent blend containing 50% toluene and 50% of an aliphatic petroleum hydrocarbon diluent containing 7% to 8% aromatics, respectively, are listed in the following table:

| Solvent | Dilution ratio | | |
|---|---|---|---|
| | With toluene | With aliphatic diluent | With aromatic diluent |
| A mixture of 86.7 weight per cent of methyl isobutyl ketone and 13.3 weight per cent of diisobutyl ketone | 3.40 | 0.85 | 1.67 |
| A mixture of 69.4 weight per cent of methyl isobutyl ketone, 10.6 weight per cent of diisobutyl ketone and 20.0 weight per cent of isopropyl alcohol | 3.96 | 1.13 | |
| Normal butyl acetate | 2.95 | 1.25 | 1.98 |
| Diisobutyl ketone | 1.39 | 0.50 | |
| A mixture of 90.0 weight per cent of methyl isobutyl ketone and 10 weight per cent of diisobutyl ketone | 3.55 | 0.97 | |

Lacquers having a low resistance to humidity may absorb water from the surrounding atmosphere, thereby causing precipitation in the drying film of some or all of the dissolved solids. Such phenomena are termed by the general expression "blushing," although this term includes also other clouding effects that may appear in or on the drying film. The high blush-resistance of methyl isobutyl ketone/diisobutyl ketone mixtures is illustrated by the following table showing the relative humidity at which incipient blushing occurs with solutions of 8% of ½ second R. S. nitrocellulose in each of several solvents and solvent mixtures. Solvents toward the bottom of the table exhibit the greatest resistance to blushing.

| Solvent | Relative humidity for incipient blush at 80° F. |
|---|---|
| Secondary butyl acetate | 77 |
| Methyl isobutyl ketone | 79.5 |
| A mixture of 69.4 weight per cent of methyl isobutyl ketone, 10.6 weight per cent of diisobutyl ketone and 20.0 weight per cent of isopropyl alcohol | 80.5 |
| Normal butyl acetate | 81.5 |
| A mixture of 83 weight per cent of methyl isobutyl ketone and 17 weight per cent of methyl isobutyl carbinol | 81.5 |
| A mixture of 90 weight per cent of methyl isobutyl ketone and 10 weight per cent of diisobutyl ketone | 84 |
| A mixture of 86.7 weight per cent of methyl isobutyl ketone and 13.3 weight per cent of diisobutyl ketone | 87 |
| Diisobutyl ketone | 96 |

The superior viscosity characteristics of the solvent mixtures of the invention can be illustrated by the following table comparing the viscosities of different concentrations of nitrocellulose, ester gum and Duraplex A-27 (alkyd resin) with normal butyl acetate and with the new blends of methyl isobutyl ketone with diisobutyl ketone.

Viscosity comparisons

[Centipoises 20° C.]

| | 8% | 10% | 15% | 20% |
|---|---|---|---|---|
| ½ SECOND R. S. NITROCELLULOSE | | | | |
| A mixture of 86.7 wt. % of methyl isobutyl ketone and 13.3 wt. % of diisobutyl ketone | 24 | 54 | 280 | 1,400 |
| Normal butyl acetate | 30 | 65 | 350 | 1,700 |
| ESTER GUM | | | | |
| A mixture of 86.7 wt. % of methyl isobutyl ketone and 13.3 wt. % of diisobutyl ketone | 0.83 | 0.89 | 1.10 | 1.42 |
| Normal butyl acetate | 1.14 | 1.20 | 1.50 | 1.92 |
| DURAPLEX A-27 | | | | |
| A mixture of 86.7 wt. % of methyl isobutyl ketone and 13.3 wt. % of diisobutyl ketone | 1.20 | 1.42 | 2.10 | 3.15 |
| Normal butyl acetate | 1.55 | 1.84 | 2.77 | 4.2 |

Methyl isobutyl ketone/diisobutyl ketone mixtures are useful as solvents for organo-soluble plastics in general. Representative examples of suitable plastics, in addition to cellulose nitrate, are cellulose organic acid esters, such as cellulose acetate, cellulose propionate, cellulose butyrate, etc.; cellulose ethers, such as ethyl cellulose; co-polymers of vinyl chloride and vinyl acetate; ester gum; alkyd resins; phenol-aldehyde resins; urea-aldehyde resins; acrylic resins, including polymethyl methacrylate, etc. The solvent mixtures of the invention can be blended with other synthetic and natural resins, drying and semi drying oils, etc., and used in lacquers, varnishes and paints of many kinds.

As a typical example of lacquers which may be prepared employing the solvent blends of the invention, the following is cited for purposes of illustration. Parts are on a weight basis.

Glossy wood lacquer

| | Parts |
|---|---|
| ½ second nitrocellulose | 6 |
| Rosin-modified maleic alkyd resin | 16.75 |
| Non-oxidizing long alkyd resin | 2.25 |
| Ethyl alcohol | 2 |
| Methyl ethyl ketone | 17 |
| A mixture of 86.7 parts of methyl isobutyl ketone and 13.3 parts of diisobutyl ketone | 20 |
| Normal butyl alcohol | 8 |
| Toluene | 15 |
| Petroleum naphtha | 13 |

I claim as my invention:

1. A composition of matter comprising an organo-soluble organic plastic dissolved in a mixture of methyl isobutyl ketone and diisobutyl ketone, the proportions of said ketones being within the range of about 91:9 to about 82:18, respectively.

2. A composition of matter comprising an organo-soluble organic plastic substance dissolved in a mixture of about 86.7 weight per cent of methyl isobutyl ketone with about 13.3 weight per cent of diisobutyl ketone.

3. A composition comprising an organo-soluble, plastic cellulose derivative dissolved in a mixture of methyl isobutyl ketone and diisobutyl ketone, the proportions of said ketones being within the range of about 91:9 to about 82:18, respectively.

4. A composition comprising nitrocellulose dissolved in a mixture of methyl isobutyl ketone and diisobutyl ketone, the proportions of said ketones being within the range of about 91:9 to about 82:18, respectively.

5. A composition comprising an alkyd resin dissolved in a mixture of methyl isobutyl ketone and diisobutyl ketone, the proportions of said ketones being within the range of about 91:9 to about 82:18, respectively.

6. A composition comprising ester gum dissolved in a mixture of methyl isobutyl ketone and diisobutyl ketone, the proportions of said ketones being within the range of about 91:9 to about 82:18, respectively.

REGINALD FRANCIS BULLER.